United States Patent

[11] 3,579,914

| [72] | Inventor | Ralph E. Price |
| | | Waynesboro, Pa. |
| [21] | Appl. No. | 744,350 |
| [22] | Filed | July 12, 1968 |
| [45] | Patented | May 25, 1971 |
| [73] | Assignee | Landis Tool Company |
| | | Waynesboro, Pa. |

[54] WORK DRIVING DEVICE
12 Claims, 5 Drawing Figs.

[52] U.S. Cl. .................................................... 51/101,
51/237
[51] Int. Cl. ........................................ B24b 17/02,
B25b 41/06
[50] Field of Search .......................................... 51/100,
101, 105, 127, 131, 145, 237 (CS), 105 (P), 50;
82/40, 40.1

[56] References Cited
UNITED STATES PATENTS

| 2,053,866 | 9/1936 | Flygare ....................... | 51/101 |
| 2,109,386 | 2/1938 | Green .......................... | 51/101 |
| 2,471,706 | 5/1949 | Spongberg et al. ............ | 51/237CS |
| 2,950,586 | 8/1960 | Smith .......................... | 51/105X |
| 2,940,227 | 6/1960 | Flohr .......................... | 51/237CS |
| 2,984,955 | 5/1961 | Price et al. ................... | 51/237 |

*Primary Examiner*—Othell M. Simpson
*Attorney*—Diller, Brown, Ramik & Holt

ABSTRACT: This disclosure relates to a work driving apparatus, particularly for a cam contour grinder, for applying a driving torque at two angularly spaced points on a workpiece so that the entire force transmitted by the work driving apparatus acts to turn the workpiece and there is no force to cause radial displacement of the workpiece. The work driving apparatus is particularly adapted for use in conjunction with a workpiece having a flange at one end and an orienting hole in the flange. The work driving apparatus includes a driving block which carries a locating pin which is proportioned for a close fit in the hole in the workpiece flange to maintain the workpiece in a predetermined oriented position during the grinding thereof. The driving block is mounted for floating movement so as to compensate for variations in workpieces and is pivotable about the axis of the locating pin to engage a jaw carried thereby with the workpiece at a point remote from the locating pin.

PATENTED MAY 25 1971 3,579,914

INVENTOR
RALPH E. PRICE

BY
Mason, Porter, Diller & Brown
ATTORNEYS

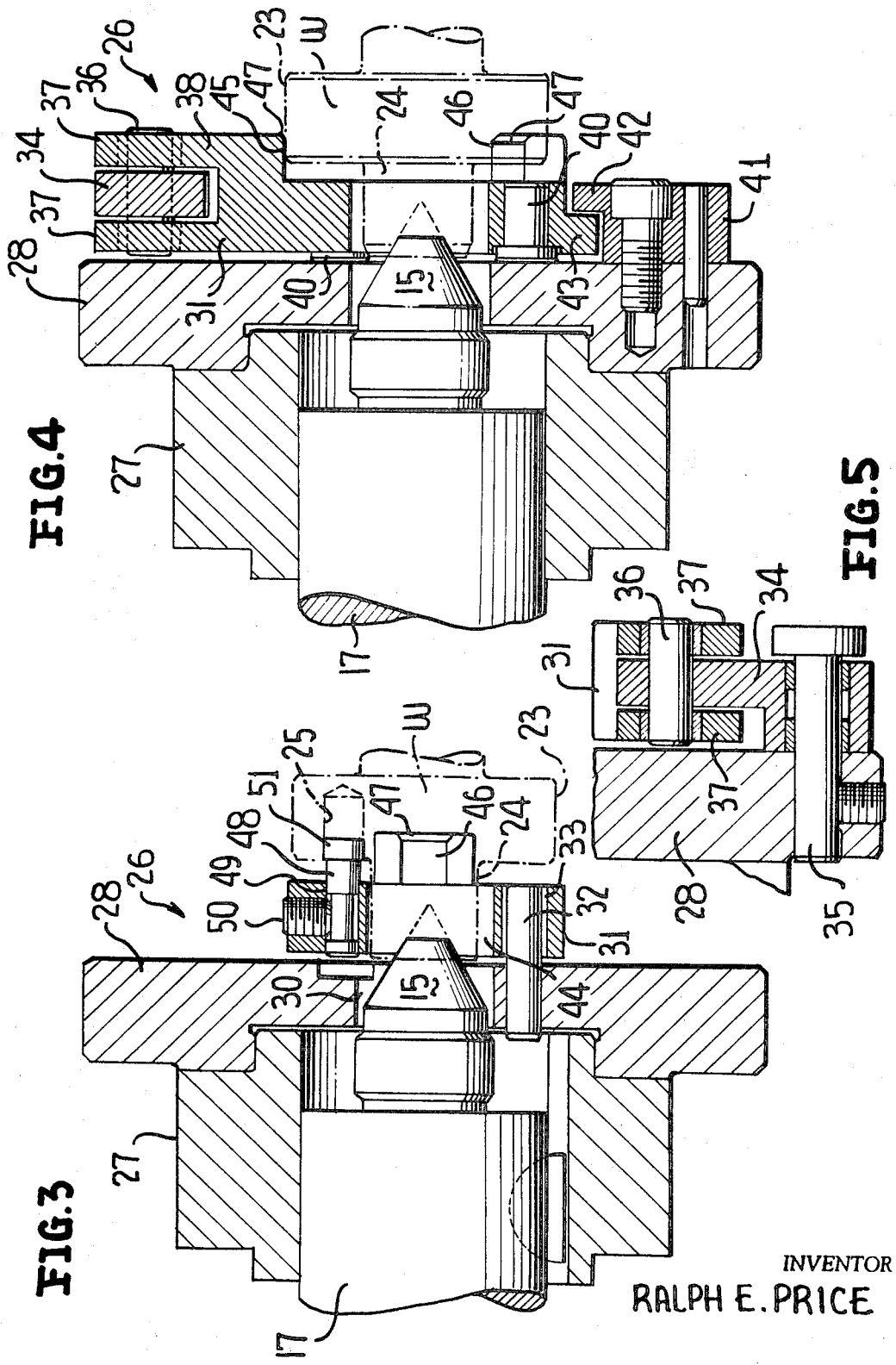

WORK DRIVING DEVICE

This invention relates in general to a work driving apparatus for rotationally driving workpieces during a machining operation, and more particularly to a work driving apparatus which is particularly adapted for use as part of a camshaft grinder for facilitating grinding operations on cam contours of camshafts.

It is to be understood that is is customary to provide a camshaft with an orienting hole in a flange thereof. This orienting hole is utilized for the purpose of orienting a cam gear or sprocket relative to the camshaft so as to assure the proper orientation of the camshaft with respect to the crankshaft of the respective engine. It is proposed to utilize this camshaft hole in the driving of the camshaft during the grinding operation performed thereon and the work driving apparatus is particularly constructed for this purpose.

It is to be understood that in the grinding of a camshaft, the camshaft is normally mounted for rotation about a fixed axis on two centers. The camshaft must be oriented relative to a master cam of the camshaft grinder prior to the initiation of the grinding operation. In the past, the means for driving a camshaft consisted of a removable fixture which was placed on each camshaft before placing it in the machine. This fixture had to be removed from the camshaft after the camshaft was ground. This, of course, resulted in two undesirable operations.

In view of the foregoing it is the object of this invention to provide a work driving apparatus with which a camshaft may be readily directly associated and wherein the connection between the work driving apparatus and the camshaft is such that there is no force to cause radial displacement of the camshaft.

Another object of this invention is to provide a novel work driving apparatus which is of a construction wherein it is automatically interlocked with the workpiece associated therewith when the workpiece is properly positioned and a rotational force is applied to the work driving apparatus, while at the same time the work driving apparatus is capable of immediately releasing the workpiece to facilitate the removal thereof at the termination of a machining operation.

A still further object of this invention is to provide a novel work driving apparatus which is particularly adapted for effecting the rotation of a camshaft during a grinding operation and wherein the work driving apparatus is particularly constructed for engaging and orienting the camshaft without the camshaft requiring any special gripping or orienting feature.

With the above and other objects in view that will hereinafter appear, the nature of the invention will be more clearly understood by reference to the following detailed description, the appended claims and the several views illustrated in the accompanying drawings:

IN THE DRAWINGS

FIG. 3 is an axial sectional view taken along the line 3—3 of FIG. 2.

FIG. 4 is an axial sectional view taken along the line 4—4 of FIG. 2.

FIG. 5 is a fragmentary axial sectional view taken along the line 5—5 of FIG. 2 and shows the specific details of a driving connection between the driving block and a driving head.

Figure 1:
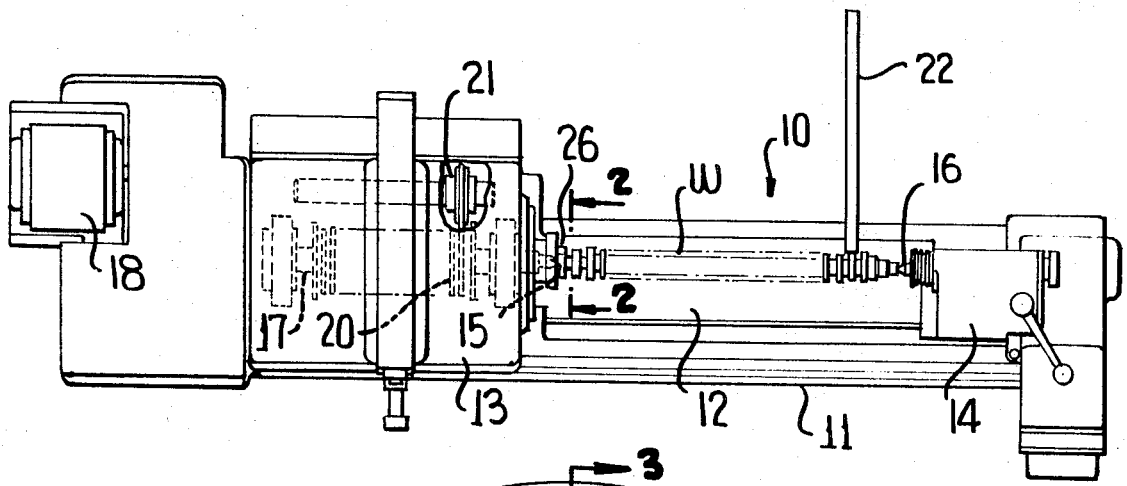
FIG. 1 is a plan view of a conventional camshaft grinder equipped with the work driving apparatus.

Referring now to the drawings in detail, it will be seen that there is illustrated a conventional camshaft grinder which is generally referred to by the numeral 10. The camshaft grinder 10, among other features, includes a base 11 on which there is mounted a cradle 12 for rocking movement. At opposite ends of the cradle 12 there are mounted a headstock 13 and a tailstock 14. The headstock 13 includes a center 15, while the tailstock 14 includes a center 16. A camshaft or other workpiece W to be ground is mounted for rotation on the centers 15 and 16 at an axis determined by the centers.

The headstock 13 also includes a spindle 17 which is suitably driven by means of a motor 18. The spindle 17 has mounted thereon for rotation therewith a master cam 20. The master cam 20 is engaged by a follower 21 to effect the rocking of the cradle 12 in timed relation to the rotation of the workpiece W so as to produce the desired cam contour thereon.

The camshaft grinder 10 also includes a grinding wheel 22 which is suitably mounted in a conventional manner for selected engagement with the lobes of the camshaft or workpiece W.

Reference is now made to FIGS. 3 and 4 where the left end of the workpiece W of FIG. 1 is shown in greater detail. The workpiece W includes a front flange 23 which has an end portion 24 projecting therefrom. The flange 23 is provided with a forwardly opening hole 25 which is radially offset from the axis of the workpiece W, which hole 25 is utilized for the purpose of orienting the camshaft or workpiece W. At this time, it is pointed out that the illustrated camshaft W is the type wherein a drive gear or sprocket is fitted on the end portion 24 in abutting relation to the front face of the flange 23 and wherein a pin in the hole 25 is received in a like hole in the gear or sprocket to orient the gear or sprocket relative to the camshaft. The gear or sprocket is secured in place on the camshaft by means of suitable fasteners so as to lock the two together as a unit.

In accordance with this invention, the hole 25 of the camshaft W is utilized both for the purpose of orienting the camshaft with respect to the master cam 20 and for imparting a rotational driving force to the camshaft. To this end, the headstock 13 is provided with a work driving apparatus, which is generally referred to by the numeral 26 and which is carried by the spindle 17 in concentric relation to the center 15. The work driving apparatus 26 includes an adapter 27 which is suitably mounted on the spindle 17 in an indexed or oriented relation to the master cam 20. A driver head or faceplate 28 is releaseably secured to the adapter 27 by means of suitable fasteners 29 (FIG. 2) with the faceplate 28 also being in a predetermined oriented relation relative to the master cam 20. It is to be noted from FIG. 3 that the faceplate 28 has a central opening 30 through which the center 15 projects.

A floating member in the form of a driving block 31 is mounted at the front of the faceplate 28 in floating relation thereto. As is clearly shown in FIGS. 2 and 3, the floating member 31 is in part loosely positioned for limited radial movement relative to the faceplate 28 by means of a pin 32 projecting from the faceplate 28 and loosely positioned in a hole 33 in the floating member. The floating member 31 is also connected to the faceplate 28 by means of a driving link 34 which extends in a direction transversely from a bifurcated end portion 37. One end of the driving link 34 is pivotally connected to the faceplate 28 by means of a pivot pin 35. The opposite end of the link 34 is pivotally connected to the floating member 31 by means of a pivot pin 36 which is carried by the bifurcated end portion 37 of an arm 38 which extends radially from the floating member 31.

Figure 2:
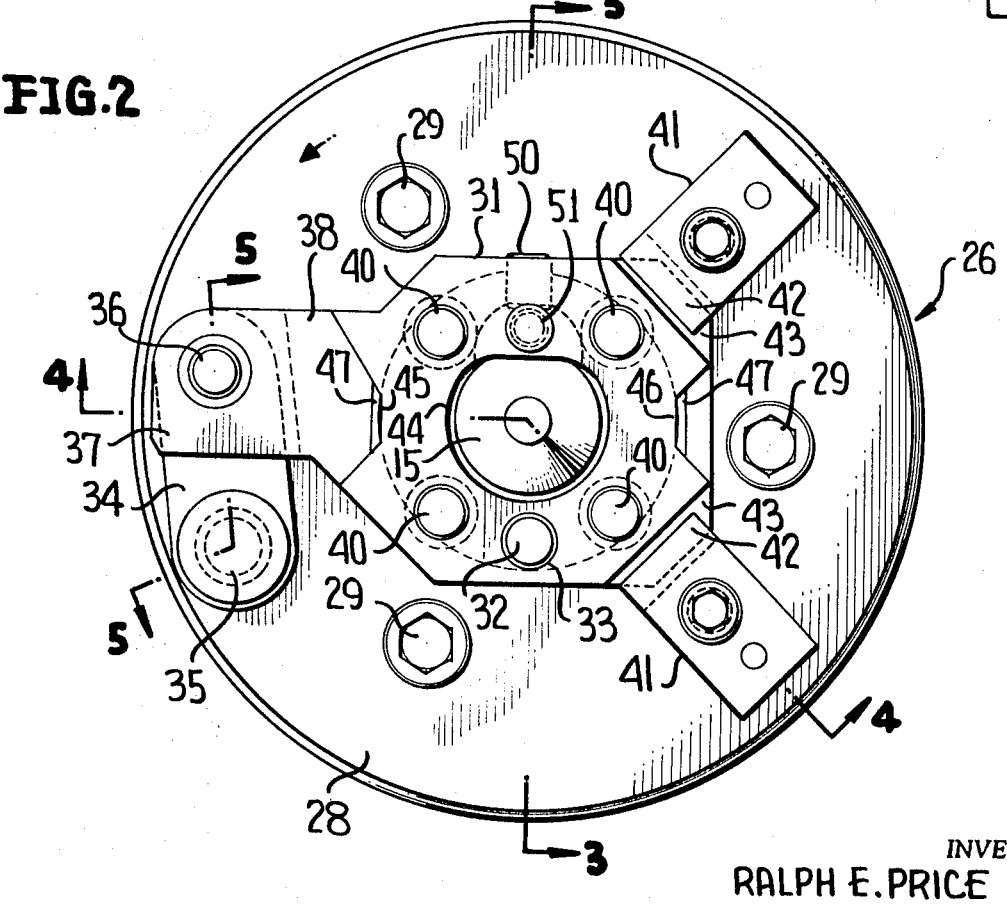
FIG. 2 is an enlarged fragmentary transverse sectional view taken along the line 2—2 of FIG. 1 and shows in elevation the work driving apparatus.

The axial movement of the floating member 31 relative to the faceplate 28 is also limited. Movement of the floating member 31 towards the faceplate 28 is limited by means of a plurality of circumferentially spaced headed pins 40 which are best shown in FIGS. 2 and 4. Movement of the floating member 31 axially away from the faceplate 28 is restricted by a pair of locating blocks 41 which are suitably secured to the face of the faceplate 28 and which have lips 42 overhanging ledges 43 on the floating member 31 remote from the arm 38.

It will be seen that the floating member 31 has a central opening 44 for loosely receiving the end portion 24. In addition, in order to facilitate the centering of the flange 23 of a workpiece with respect to the floating member 31, the floating member 31 has a pair of opposed jaws 45 and 46. The jaws 45 and 46 have chamfered face portions 47 to facilitate the positioning of a flange between the jaws.

Referring now to FIG. 3, it will be seen that the floating member 31 is provided with a locating or orienting pin 48 which is adjustably seated in a bore 49 in the locating member and retained in position by means of a setscrew 50. The locating pin 48 is provided with an enlarged head 51 of a cross section to be snugly received in the hole 25 in the workpiece.

At this time it is pointed out that the connection between the floating member 31 and the faceplate 28 is of a nature wherein when the floating member 31 is engaged with a workpiece in driving relation relative thereto, the locating pin 48 has a predetermined index or oriented position relative to the master cam 20 and when the locating pin 48 is seated within a workpiece hole 25 and the workpiece is engaged by the work driving apparatus 26 in driving relation, the workpiece will be of the proper orientation with respect to the master cam 20.

OPERATION

It will be readily apparent from the drawings that when a workpiece, such as the illustrated camshaft, is to be positioned relative to the work driving apparatus 26, the camshaft is rotationally oriented until the hole 25 thereof is generally aligned with the locating pin 48. Then the end portion 24 is positioned within the opening 44 of the floating member 31, and the flange 23 is brought into engagement with the jaws 45 and 46. Due to the chamfered face portion 47 on the jaws, there will be an automatic relative alignment of the floating member 31 and the camshaft flange 23 with the result that the camshaft flange 23 may be inserted between the jaws 45 and 46.

The jaws 45 and 46, being spaced apart a distance only slightly greater than the diameter of the flange 23, will result in an automatic radial centering of the hole 25 with respect to the locating pin 48. Then by slightly rotating the camshaft, alignment of the hole 25 with the locating pin 48 will result and the flange 23 may be readily slid over the locating pin 48. At this time, the end portion 24 of the camshaft will slide over the center 15 with the result that both the camshaft and the floating member 31 will automatically be centered with respect to the axis of rotation determined by the centers 15 and 16. Then the center 16 is brought into engagement with the opposite end of the camshaft or workpiece W and the workpiece is mounted for rotation about the predetermined axis and ready to be rotationally driven.

When the faceplate 28 is rotated in a counterclockwise direction, as viewed in FIG. 2, the link 34 will exert a pulling force on the arm 38 with the result that the floating member 31 will pivot in a counterclockwise direction about the locating pin 48, thereby bringing the jaw 45 into clamping engagement with the flange 23. During the continued rotation of the faceplate 28, the floating member 31 will be locked with the workpiece in driving engagement therewith by means of the indexing pin 48 and the jaw 45. Inasmuch as the workpiece is drivingly engaged at two widely circumferentially spaced points, the force imparted to the workpiece by the floating member 31 will be solely rotational and there will be no force to cause radial displacement of the workpiece relative to the center 15.

Although only a preferred embodiment of the driving apparatus has been specifically illustrated and described herein, it is to be understood that minor variations may be made in the work driving apparatus without departing from the spirit of the invention.

I claim:

1. In a machine tool for machining a workpiece to a predetermined and oriented configuration and wherein said machine tool includes a pattern device, a work driving device for transmitting torque to a workpiece, said work driving device comprising torque transmitting means, said torque transmitting means including an indexing element for maintaining a substantially fixed oriented relationship between said pattern device and said workpiece, said torque transmitting means further including work engaging means mounted at a point fixed with respect to said indexing element for pivoting and engaging said workpiece at a point angularly spaced from said indexing element upon rotation of said torque transmitting means, whereby the torque is applied at least at two angularly spaced points on the workpiece, a driving member, said torque transmitting means having a radially extending arm, said arm being pivotally connected by a link to said driving member which is disposed in angularly spaced relation to said arm, whereby said torque transmitting means is free to float in all radial directions and thus adapt itself for varying workpieces.

2. The work driving device of claim 1, and further including means restraining said torque transmitting means against axial movement.

3. The work driving device of claim 2, wherein said restraining means includes spaced lips and flat head pins.

4. In a machine tool for machining a workpiece to a predetermined and oriented configuration and wherein said machine tool includes a pattern device, a work driving device for transmitting torque to a workpiece, said work driving device comprising torque transmitting means, said torque transmitting means including an indexing element for maintaining a substantially fixed oriented relationship between said pattern device and said workpiece, said torque transmitting means further including work engaging means mounted at a point fixed with respect to said indexing element for pivoting and engaging said workpiece at a point angularly spaced from said indexing element upon rotation of said torque transmitting means, whereby the torque is applied at least at two angularly spaced points on the workpiece, said machine tool being a camshaft grinder and being particularly adapted for machining a camshaft having an axially extending and radially offset orienting hole at one end thereof, said torque transmitting means being in the form of a floating member mounted for limited radial and axial floating movement for compensating for slight variations in workpieces, and said indexing element being in the form of a pin adapted to snugly engage in a camshaft orienting hole.

5. In a machine tool of the type particularly adapted for machining a workpiece to a predetermined and oriented configuration, and wherein said machine tool includes a pair of opposed centers adapted to have a workpiece mounted therebetween for rotation about a predetermined axis, and a pattern device; a work driving device particularly adapted for cooperation with a workpiece having an orienting recess at one end thereof, said work driving device comprising a faceplate mounted for rotation about said axis adjacent one of said centers, said faceplate being in fixed oriented relation to said pattern device, a floating driving member mounted on said faceplate for limited axial and radial floating movement, a driving connection between said faceplate and said floating driving member, an indexing element carried by said floating driving member for engagement in a workpiece recess both to index a workpiece and to facilitate the rotation thereof, a driving jaw engageable with a workpiece in circumferentially spaced relation to said indexing element upon relative pivoting of said floating driving member and a workpiece about said indexing element and cooperable with said indexing element to drive a workpiece while applying a minimal radial force to the workpiece.

6. The machine tool of claim 5, wherein said driving jaw is carried by said floating driving member.

7. The machine tool of claim 6 wherein said floating driving member has an aligning surface opposing said driving jaw and cooperating therewith to facilitate alignment and engagement between said floating driving member and a workpiece.

8. The machine tool of claim 5 wherein said driving connection includes a pivotal link and said pivotal link forms the sole driving connection between said floating driving member and said faceplate.

9. In a machine tool for machining a workpiece to a predetermined and oriented configuration and wherein said machine tool includes a pattern device, a work driving device for transmitting torque to a workpiece, said work driving device including a faceplate, a torque transmitting member, means mounting said torque transmitting member on said faceplate for freedom to float in all radial directions whereby said torque transmitting member is adaptable to varying workpieces, an indexing element carried by said torque transmitting member for maintaining a substantially fixed oriented relationship between said pattern device and a workpiece, a link connecting said torque transmitting member to said faceplate for applying a driving force to said torque transmitting member, and further work engaging means for drivingly engaging a workpiece at a point remote from said indexing element upon shifting of said torque transmitting member in response to engagement of said indexing element with a workpiece and rotation of said faceplate whereby torque is applied at two angularly spaced points on a workpiece.

10. The work driving device of claim 9 wherein said link is directly connected to said torque transmitting member and said torque transmitting member is free to pivot about said indexing element.

11. The work driving device of claim 10 wherein said further work engaging means is rigidly mounted on said torque transmitting member.

12. The work driving device of claim 9 wherein said further work engaging means is rigidly mounted on said torque transmitting member.